US006583178B2

(12) United States Patent
D'Ambrogio et al.

(10) Patent No.: US 6,583,178 B2
(45) **Date of Patent: *Jun. 24, 2003**

(54) ANTIBACTERIAL LIQUID DISH CLEANING COMPOSITIONS HAVING IMPROVED VISCOSITY

(75) Inventors: Robert D'Ambrogio, Bound Brook, NJ (US); Evangelia Arvanitidou, Kendall Park, NJ (US); David Suriano, Monroe Township, NJ (US); Robert Heffner, Somerset, NJ (US)

(73) Assignee: Colgate Palmolive Company, New York, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 10/085,556

(22) Filed: Feb. 27, 2002

(65) Prior Publication Data

US 2002/0197293 A1 Dec. 26, 2002

Related U.S. Application Data

(63) Continuation-in-part of application No. 09/853,791, filed on May 11, 2001, now Pat. No. 6,441,037.

(51) Int. Cl.[7] ........................ A01N 37/00; A01N 25/00; A01N 31/00; A01N 41/02; C11D 1/94

(52) U.S. Cl. ........................ 514/557; 510/235; 510/405; 510/422; 510/434; 510/470; 510/475; 510/477; 510/505; 510/506; 514/709; 514/723; 514/724; 514/738; 514/772; 514/772.5; 514/772.7; 514/781; 514/784; 514/975

(58) Field of Search .......................... 424/616; 514/557, 514/925, 568, 724, 731, 975, 709, 723, 738, 772, 784, 772.5, 772.7, 781; 510/235, 405, 422, 434, 477, 505, 506, 508, 470, 475

(56) References Cited

U.S. PATENT DOCUMENTS 6,441,037 B1 * 8/2002 Arvanitidou et al. ....... 514/557
6,444,636 B1 * 9/2002 Toussaint et al. ........... 510/426

* cited by examiner

*Primary Examiner*—Jose' G. Dees
*Assistant Examiner*—Frank Choi
(74) *Attorney, Agent, or Firm*—Richard E. Nanfeldt

(57) ABSTRACT

An antibacterial liquid dish cleaning composition with desirable cleansing properties comprising a $C_{8-18}$ ethoxylated alkyl ether sulfate, two anionic surfactant, a betaine surfactant, a hydroxy containing organic acid, an organic thickener, polyethylene glycol and water.

1 Claim, No Drawings

ANTIBACTERIAL LIQUID DISH CLEANING COMPOSITIONS HAVING IMPROVED VISCOSITY

RELATED APPLICATION

This application is a continuation in part application of U.S. Ser. No. 09/853,791 filed May 11, 2001, now U.S. Pat. No. 6,441,037.

FIELD OF INVENTION

This invention relates to an antibacterial liquid dish cleaning composition of lower active surfactant level, having improved viscosity which is designed to disinfect the surface being treated while maintaining good foaming grease cutting, rinsing and mildness properties.

BACKGROUND OF THE INVENTION

The present invention relates to novel light duty liquid detergent compositions with an improved viscosity, high foaming and good grease cutting properties as well as disinfecting properties.

The prior art is replete with light duty liquid detergent compositions containing nonionic surfactants in combination with anionic and/or betaine surfactants wherein the nonionic detergent is not the major active surfactant. In U.S. Pat. No. 3,658,985 an anionic based shampoo contains a minor amount of a fatty acid alkanolamide. U.S. Pat. No. 3,769,398 discloses a betaine-based shampoo containing minor amounts of nonionic surfactants. This patent states that the low foaming properties of nonionic detergents renders its use in shampoo compositions non-preferred. U.S. Pat. No. 4,329,335 also discloses a shampoo containing a betaine surfactant as the major ingredient and minor amounts of a nonionic surfactant and of a fatty acid mono- or di-ethanolamide. U.S. Pat. No. 4,259,204 discloses a shampoo comprising 0.8 to 20% by weight of an anionic phosphoric acid ester and one additional surfactant which may be either anionic, amphoteric, or nonionic. U.S. Pat. No. 4,329,334 discloses an anionic-amphoteric based shampoo containing a major amount of anionic surfactant and lesser amounts of a betaine and nonionic surfactants.

U.S. Pat. No. 3,935,129 discloses a liquid cleaning composition containing an alkali metal silicate, urea, glycerin, triethanolamine, an anionic detergent and a nonionic detergent. The silicate content determines the amount of anionic and/or nonionic detergent in the liquid cleaning composition. However, the foaming properties of these detergent compositions are not discussed therein.

U.S. Pat. No. 4,129,515 discloses a heavy duty liquid detergent for laundering fabrics comprising a mixture of substantially equal amounts of anionic and nonionic surfactants, alkanolamines and magnesium salts, and, optionally, zwitterionic surfactants as suds modifiers.

U.S. Pat. No. 4,224,195 discloses an aqueous detergent composition for laundering socks or stockings comprising a specific group of nonionic detergents, namely, an ethylene oxide of a secondary alcohol, a specific group of anionic detergents, namely, a sulfuric ester salt of an ethylene oxide adduct of a secondary alcohol, and an amphoteric surfactant which may be a betaine, wherein either the anionic or nonionic surfactant may be the major ingredient.

The prior art also discloses detergent compositions containing all nonionic surfactants as shown in U.S. Pat. Nos. 4,154,706 and 4,329,336 wherein the shampoo compositions contain a plurality of particular nonionic surfactants in order to affect desirable foaming and detersive properties despite the fact that nonionic surfactants are usually deficient in such properties.

U.S. Pat. No. 4,013,787 discloses a piperazine based polymer in conditioning and shampoo compositions which may contain all nonionic surfactant or all anionic surfactant.

U.S. Pat. No. 4,450,091 discloses high viscosity shampoo compositions containing a blend of an amphoteric betaine surfactant, a polyoxybutylenepolyoxyethylene nonionic detergent, an anionic surfactant, a fatty acid alkanolamide and a polyoxyalkylene glycol fatty ester. But, none of the exemplified compositions contain an active ingredient mixture wherein the nonionic detergent is present in major proportion which is probably due to the low foaming properties of the polyoxybutylene polyoxyethylene nonionic detergent.

U.S. Pat. No. 4,595,526 describes a composition comprising a nonionic surfactant, a betaine surfactant, an anionic surfactant and a $C_{12}$–$C_{14}$ fatty acid monoethanolamide foam stabilizer.

U.S. Pat. No. 6,147,039 teaches an antibacterial hand cleaning composition having a low surfactant content.

SUMMARY OF THE INVENTION

It has now been found that an antibacterial liquid dish cleaning composition having improved viscosity can be formulated with three different anionic surfactants, a zwitterionic surfactant, polyethylene glycol, a hydroxy aliphatic acid, an organic thickener, and water which has desirable cleaning and foaming properties.

An object of this invention is to provide an antibacterial liquid dish cleaning composition which comprises a sulfate surfactant, two sulfonate anionic surfactants, a zwitterionic surfactant, an organic thickener, polyethylene glycol, a hydroxy aliphatic acid and water, wherein the composition does not contain any silicas, abrasives, acyl isoethionate, 2-hydroxy-4,2',4'-trichloridiphenyl ether, phosphoric acid, phosphonic acid, boric acid, alkali metal carbonates, alkaline earth metal carbonates, alkyl glycine surfactant, cyclic imidinium surfactant, or more than 3 wt. % of a fatty acid or salt thereof.

Another object of this invention is to provide an antibacterial liquid dish cleaning composition having improved viscosity and with desirable high foaming and cleaning properties which kills bacteria.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

This invention relates to an antibacterial liquid dish cleaning composition which comprises approximately by weight:

(a) 4% to 16% of a sodium salt of a $C_8$–$C_{16}$ linear alkyl benzene sulfonate surfactant;

(b) 4% to 16% of a magnesium salt of a $C_8$–$C_{16}$ linear alkyl benzene sulfonate surfactant;

(c) 4% to 16% of an ammonium or sodium salt of an ethoxylated $C_8$–$C_{18}$ alkyl ether sulfate surfactant;

(d) 0.1% to 5% of a zwitterionic surfactant;

(e) 0.5% to 5%, more preferably 0.5% to 4% of a hydroxy containing organic acid;

(f) 0.1% to 7% of polyethylene glycol having a molecular weight of about 200 to 1,000;

(g) 0.1% to 2%, more preferably 0.2%, more preferably 0.2% to 1.5% of an organic thickener; and (h) the balance being water, wherein the composition has a pH of 3 to 4 and has a viscosity of 200 to 800 cps, more preferably 200 to 600 cps at 25° C. using a #21 spindle at 20 rpm as measured on a Brookfield RVTDV-II viscometer, wherein the composition does not contain any grease release agents such as choline, chloride or buffering system which is a nitrogenous buffer which is ammonium or alkaline earth carbonate, amine oxide surfactants, guanidine derivates, alkoxylalkyl amines and alkyleneamines $C_3$–$C_7$ alkyl and alkenyl monobasic and dibasic acids such as $C_4$–$C_7$ aliphatic carboxylic diacids which do not contain a hydroxy group, boric acid, phosphoric acid, ethoxylated nonionic surfactants, amino alkylene phosphonic acid and alkyl polyglucoside surfactants.

The anionic sulfonate surfactants which may be used in the detergent of this invention are selected from the consisting of water soluble and include the sodium, potassium, ammonium, magnesium and ethanolammonium salts of linear $C_8$–$C_{16}$ alkyl benzene sulfonates; $C_{10}$–$C_{20}$ paraffin sulfonates, alpha olefin sulfonates containing about 10–24 carbon atoms and $C_8$–$C_{18}$ alkyl sulfates and mixtures thereof.

The paraffin sulfonates may be monosulfonates or di-sulfonates and usually are mixtures thereof, obtained by sulfonating paraffins of 10 to 20 carbon atoms. Preferred paraffin sulfonates are those of $C_{12-18}$ carbon atoms chains, and more preferably they are of $C_{14-17}$ chains. Paraffin sulfonates that have the sulfonate group(s) distributed along the paraffin chain are described in U.S. Pat. Nos. 2,503,280; 2,507,088; 3,260,744; and 3,372,188; and also in German Patent 735,096. Such compounds may be made to specifications and desirably the content of paraffin sulfonates outside the $C_{14-17}$ range will be minor and will be minimized, as will be any contents of di- or poly-sulfonates.

Examples of suitable other sulfonated anionic detergents are the well known higher alkyl mononuclear aromatic sulfonates, such as the higher alkylbenzene sulfonates containing 9 to 18 or preferably 9 to 16 carbon atoms in the higher alkyl group in a straight or branched chain, or $C_{8-15}$ alkyl toluene sulfonates. A preferred alkylbenzene sulfonate is a linear alkylbenzene sulfonate having a higher content of 3-phenyl (or higher) isomers and a correspondingly lower content (well below 50%) of 2-phenyl (or lower) isomers, such as those sulfonates wherein the benzene ring is attached mostly at the 3 or higher (for example 4, 5, 6 or 7) position of the alkyl group and the content of the isomers in which the benzene ring is attached in the 2 or 1 position is correspondingly low. Preferred materials are set forth in U.S. Pat. No. 3,320,174, especially those in which the alkyls are of 10 to 13 carbon atoms.

The $C_{8-18}$ ethoxylated alkyl ether sulfate surfactants have the structure $$R—(OCHCH_2)_nOSO_3^-M^+$$

wherein n is about 1 to about 22 more preferably 1 to 3 and R is an alkyl group having about 8 to about 18 carbon atoms, more preferably 12 to 15 and natural cuts, for example, $C_{12-14}$ or $C_{12-16}$ and M is an ammonium cation or a metal cation, most preferably sodium.

The ethoxylated alkyl ether sulfate may be made by sulfating the condensation product of ethylene oxide and $C_{8-10}$ alkanol, and neutralizing the resultant product. The ethoxylated alkyl ether sulfates differ from one another in the number of carbon atoms in the alcohols and in the number of moles of ethylene oxide reacted with one mole of such alcohol. Preferred ethoxylated alkyl ether polyethenoxy sulfates contain 12 to 15 carbon atoms in the alcohols and in the alkyl groups thereof, e.g., sodium myristyl (3 EO) sulfate.

Ethoxylated $C_{8-18}$ alkylphenyl ether sulfates containing from 2 to 6 moles of ethylene oxide in the molecule are also suitable for use in the invention compositions. These detergents can be prepared by reacting an alkyl phenol with 2 to 6 moles of ethylene oxide and sulfating and neutralizing the resultant ethoxylated alkylphenol. The concentration of the ethoxylated alkyl ether sulfate surfactant is about 1 to about 8 wt. %.

The water-soluble zwitterionic surfactant, which is an essential ingredient of present liquid detergent composition, provides good foaming properties and mildness to the present nonionic based liquid detergent. The zwitterionic surfactant is a water soluble betaine having the general formula:

$$R_1—\overset{R_2}{\underset{R_3}{N}}—R_4—COO—$$

wherein $R_1$ is an alkyl group having 10 to 20 carbon atoms, preferably 12 to 16 carbon atoms, or the amido radical:

$$R—\overset{O}{C}—\overset{H}{N}—(CH_2)_a—$$

wherein R is an alkyl group having 9 to 19 carbon atoms and a is the integer 1 to 4; $R_2$ and $R_3$ are each alkyl groups having 1 to 3 carbons and preferably 1 carbon; $R_4$ is an alkylene or hydroxyalkylene group having from 1 to 4 carbon atoms and, optionally, one hydroxyl group. Typical alkyldimethyl betaines include decyl dimethyl betaine or 2-(N-decyl-N,N-dimethyl-ammonia) acetate, coco dimethyl betaine or 2-(N-coco N,N-dimethylammonio) acetate, myristyl dimethyl betaine, palmityl dimethyl betaine, lauryl diemethyl betaine, cetyl dimethyl betaine, stearyl dimethyl betaine, etc. The amidobetaines similarly include cocoamidoethylbetaine, cocoamidopropyl betaine and the like. A preferred betaine is coco ($C_8$–$C_{18}$) amidopropyl dimethyl betaine.

The hydroxy containing organic acid is ortho hydroxy benzoic acid or preferably a hydroxy aliphatic acid selected from the group consisting of lactic acid, citric acid, salicylic acid and glycolic and mixtures thereof.

Polyethylene glycol which is used in the instant composition has a molecular weight of 200 to 1,000, wherein the polyethylene glycol has the structure $$HO(CH_2CH_2O)_nH$$

wherein n is 4 to 52. The concentration of the polyethylene glycol in the instant composition is 0.1% to 7 wt. %, more preferably 0.1 wt. % to 5 wt. %.

The instant light duty liquid nonmicroemulsion compositions can contain about 0 wt. % to about 10 wt. %, more preferably about 1 wt. % to about 8 wt. %, of at least one solubilizing agent selected from the group consisting of a $C_{2-5}$ mono, dihydroxy or polyhydroxy alkanols such as ethanol, isopropanol, glycerol ethylene glycol, diethylene glycol, propylene glycol, and hexylene glycol and mixtures thereof and alkali metal cumene or xylene sulfonates such as sodium cumene sulfonate and sodium xylene sulfonate. The solubilizing agents are included in order to control low temperature cloud clear properties.

The organic thickener used in the instant compositions are selected from the group consisting of polyvinyl pyrrolidone of molecular weight between 1,000,000 to 2,000,000 (Luviskal K90, BASF), a polyethylene glycol having a molecular weight of 100,000 to 500,000 such as Polyox WSR-N750 from Dow Chemical and a polyquaterium-10 such as Ucare JR-125 from Amerchol which is quaternized hydroxyethyl cellulose.

The instant formulas explicitly exclude alkali metal silicates and alkali metal builders such as alkali metal polyphosphates, alkali metal carbonates, alkali metal phosphonates and alkali metal citrates because these materials, if used in the instant composition, would cause the composition to have a high pH as well as leaving residue on the surface being cleaned.

The final essential ingredient in the inventive compositions having improved interfacial tension properties is water. The proportion of water in the compositions generally is in the range of 10% to 95%.

The liquid cleaning composition of this invention may, if desired, also contain other components either to provide additional effect or to make the product more attractive to the consumer. The following are mentioned by way of example: Colors or dyes in amounts up to 0.5% by weight; bactericides in amounts up to 1% by weight; preservatives, UV absorbents, or antioxidizing agents, such as formalin, 5-bromo-5-nitro-dioxan-1,3; 5-chloro-2-methyl-4-isothaliazolin-3-one, 2,6-di-tert.butyl-p-cresol, etc., in amounts up to 2% by weight; HEDTA for color improvement under stressed sun conditions, up to 1% and pH adjusting agents, such as sulfuric acid or sodium hydroxide, as needed. Furthermore, if opaque compositions are desired, up to 4% by weight of an opacifier may be added.

In final form, the instant compositions exhibit stability at reduced and increased temperatures. More specifically, such compositions remain clear and stable in the range of 0° C. to 50° C., especially 5° C. to 43° C. Such compositions exhibit a pH of 3 to 5.

The following examples illustrate the liquid body cleaning compositions of the described invention. Unless otherwise specified, all percentages are by weight. The exemplified compositions are illustrative only and do not limit the scope of the invention. Unless otherwise specified, the proportions in the examples and elsewhere in the specification are by weight.

The Modified Germicidal Spray Test was used to determine the surface disinfection profile. The Modified Germicidal Spray test protocol was designed by MicroBiotest Inc., Sterling Va., to determine percentage of 99.9% of germs killed on hard surfaces such as dishware. The method determines the efficacy of products intended to be used for one-step cleaning and germ killing on surface of dishware and is based on the Germicidal Spray Products test, Official Methods of Analysis, Sixteenth edition, 1995, AOAC.

EXAMPLE 1

The following compositions are listed as a wt. %. The reported viscosity was measured using a Brookfield model RVTDV-II with spindle #21 at 20 rpm and 25C temperature. Target viscosity was 450±75 cps.

| | A | B | C | D |
|---|---|---|---|---|
| Magnesium linear alkyl benzene sulfonate | 12.915 | 12.915 | 12.915 | 12.915 |
| Sodium linear alkyl benzene sulfonate | 12.915 | 12.915 | 12.915 | 12.915 |
| Ammonium alkyl ether sulfate 1.3EO | 12.670 | 12.670 | 12.670 | 12.670 |
| Polyethylene glycol Mol. wt. = 300 | 4.0 | 4.0 | 4.0 | 4.0 |
| Lactic acid | 2.0 | 2.0 | 2.0 | 2.0 |
| Cocoamidopropyl betaine | 0.5 | 0.5 | 0.5 | 0.5 |
| Fragrance | 0.45 | 0.45 | 0.45 | 0.45 |
| HEDTA chelant | 0.083 | 0.083 | 0.083 | 0.083 |
| UV absorber (Tinoguard AS) | 0.015 | 0.015 | 0.015 | 0.015 |
| Orange color | 0.003 | 0.003 | 0.003 | 0.003 |
| Polymeric thickener | | | | |
| Ucare JR-125 | | 0.100 | | |
| PVP K90 | | | 0.100 | |
| Polyox WSR-N750 | | | | 0.100 |
| Deionized water | Balance | Balance | Balance | Balance |
| Viscosity (cps) | 300 | 485 | 475 | 470 |
| Modified GST (1% dilution, 1 minute contact time/staph aureus and e-coli or salmonella)/Log reduction | >=3 log | >=3 log | >=3 log | >=3 log |

EXAMPLE 2

The following compositions are listed as a wt. %. The reported viscosity was measured using a Brookfield model RVTDV-II with spindle #21 at 20 rpm and 25C temperature. Target viscosity was 450±75 cps.

| | A | B | C |
|---|---|---|---|
| Magnesium linear alkyl benzene sulfonate | 8.610 | 8.610 | 8.610 |
| Sodium linear alkyl benzene sulfonate | 8.610 | 8.610 | 8.610 |
| Ammonium alkyl ether sulfate 1.3EO | 8.447 | 8.447 | 8.447 |
| Polyethylene glycol Mol. wt. = 300 | 2.667 | 2.667 | 2.667 |
| Lactic acid | 1.333 | 1.333 | 1.333 |
| Cocoamidopropyl betaine | 0.333 | 0.333 | 0.333 |
| Fragrance | 0.280 | 0.280 | 0.280 |
| DMDM Hydantoine preservative | 0.100 | 0.100 | 0.100 |
| Kathon CG preservative | 0.0003 | 0.0003 | 0.0003 |
| HEDTA chelant | 0.083 | 0.083 | 0.083 |
| UV absorber (Tinoguard AS) | 0.010 | 0.010 | 0.010 |
| Orange color | 0.003 | 0.003 | 0.003 |
| Thickener | | | |
| PVP K90 | | 0.45 | |
| Polyox WSR-N750 | | | 0.55 |
| Deionized water | Balance | Balance | Balance |
| Viscosity (cps) | 225 | 485 | 485 |
| Modified GST (2% dilution, 1 minute contact time/staph aureus and e-coli or salmonella)/Log reduction | >=3 log | >=3 log | >=3 log |

What is claimed:

1. An antibacterial liquid dish cleaning composition which comprises approximately by weight:

(a) 4% to 16% of a sodium salt of a $C_8$–$C_{16}$ linear alkyl benzene surfactant surfactant;

(b) 4% to 16% of a magnesium salt of a $C_8$–$C_{16}$ linear alkyl benzene surfactant;

(c) 4% to 16% of an ammonium or sodium salt of an ethoxylated $C_8$–$C_{18}$ alkyl ether sulfate surfactant;

(d) 0.1% to 5% of a zwitterionic surfactant;

(e) 0.5% to 5% of a hydroxyl containing organic acid;

(f) 0.1% to 7% of polyethylene glycol having a molecular weight of 200 to 1,000;

(g) 0.1% to 2% of an organic thickener, wherein said organic thickener is selected from the group consisting of polyethylene glycol having a molecular weight of 100,000 to 500,000, a polyvinyl pyrrolidone having a molecular weight of 1,000,000 to 2,000,000 and a quaternized hydroxyethyl cellulose; and (h) the balance being water, wherein the composition has a pH of 3 to 4 and has a viscosity 200 to 800 cps at 25° C. using a #21 spindle at 20 rpm as measured on a Brookfield RVTDV-II viscometer, wherein the composition does not contain any choline chloride, ammonium or alkaline earth carbonate, amine oxide surfactants, guanidine derivates, alkoxylalkyl amines and alkyleneamines, $C_3$–$C_7$ alkyl and alkenyl monobasic and dibasic acids which do not contain a hydroxy group, boric acid, phosphoric acid, ethoxylated nonionic surfactants, amino akylene phosphonic acid and alkyl polyglucoside surfactants.

* * * * *